United States Patent
Buckley et al.

(10) Patent No.: US 7,164,912 B2
(45) Date of Patent: Jan. 16, 2007

(54) APPARATUS, AND ASSOCIATED METHOD, FOR FACILITATING SELECTION BY A MOBILE NODE OF A NETWORK THROUGH WHICH TO COMMUNICATE USING A HIERARCHICAL SELECTION PROCESS

(75) Inventors: Adrian Buckley, Brentwood, CA (US); Andrew M Allen, Mundelein, IL (US)

(73) Assignee: Research In Motion Limited, Waterloo (CA)

( * ) Notice: Subject to any disclaimer, the term of this patent is extended or adjusted under 35 U.S.C. 154(b) by 227 days.

(21) Appl. No.: 10/787,065

(22) Filed: Feb. 25, 2004

(65) Prior Publication Data
US 2005/0148332 A1 Jul. 7, 2005

Related U.S. Application Data

(60) Provisional application No. 60/534,811, filed on Jan. 7, 2004.

(51) Int. Cl.
*H04Q 7/20* (2006.01)
(52) U.S. Cl. ............... 455/435.2; 455/426.1; 455/422.1; 370/328
(58) Field of Classification Search ............. 455/435.2, 455/426.1, 422.1; 370/328
See application file for complete search history.

(56) References Cited

U.S. PATENT DOCUMENTS

| | | | |
|---|---|---|---|
| 5,586,338 A | 12/1996 | Lynch | |
| 5,734,980 A | 3/1998 | Hooper | |
| 6,480,725 B1 * | 11/2002 | Cassidy et al. | 455/558 |
| 6,799,038 B1 * | 9/2004 | Gopikanth | 455/435.2 |
| 2003/0119481 A1 | 6/2003 | Haverinen | |
| 2004/0209593 A1 * | 10/2004 | Alberth et al. | 455/403 |
| 2005/0003816 A1 * | 1/2005 | Vardoulias et al. | 455/435.2 |
| 2005/0090255 A1 * | 4/2005 | Kuchibhotla et al. | 455/435.2 |
| 2005/0227692 A1 * | 10/2005 | Kawashima et al. | 455/435.2 |

OTHER PUBLICATIONS

Mouly M, et.al.: "The GSM System for Mobile Communications Passage," 1992, GSM System for Mobile Communications, XX,XX, pp. 446-459, XP-002206125.

* cited by examiner

*Primary Examiner*—Joseph Feild
*Assistant Examiner*—S. Smith (57) ABSTRACT

Apparatus, and an associated method, for facilitating selection of with which wireless local area network, or other network, that a mobile node should attempt to communicate. A plurality of listings are maintained at storage entities embodied at, or otherwise accessible by, a mobile node. The listings are accessed, in sequence, and entries contained in the listings are compared with networks in whose coverage areas that the mobile node is positioned. Communications are attempted to be effectuated, if possible, with networks in whose coverage area that the mobile node is positioned and whose identities are stored at the first-access listing.

20 Claims, 4 Drawing Sheets

APPARATUS, AND ASSOCIATED METHOD, FOR FACILITATING SELECTION BY A MOBILE NODE OF A NETWORK THROUGH WHICH TO COMMUNICATE USING A HIERARCHICAL SELECTION PROCESS

CROSS-REFERENCE TO RELATED APPLICATIONS

The present application claims the priority of provisional patent application Ser. No. 60/534,811, filed Jan. 7, 2004, the contents of which are incorporated herein.

The present invention relates generally to a manner by which to facilitate selection, at a mobile node, of a wireless local area network (WLAN) or other radio network; through which to communicate. More particularly, the present invention relates to apparatus, and an associated method, by which to select an available WLAN, or other radio network, through which to attempt to communicate using a hierarchical selection process.

A plurality of lists is created and maintained at the mobile node. Each list selectably contains entries identifying networks to which the mobile node is permitted to communicate. The lists define a hierarchy of network selection that prioritizes the networks with which the mobile node is permitted to communicate. Use of a plurality of lists provides improved selectivity of network selection. Network entries contained on the separate lists identify networks using separate selection criteria. When communications are to be effectuated by the mobile node, determinations of with which network through which to attempt to communicate are made by accessing the lists in sequence. If communications can be effectuated with a network indicated on a first-accessed list, subsequent lists need not be accessed. Thereby, the lists define a hierarchy of networks that permits the hierarchical selection process to be performed.

BACKGROUND OF THE INVENTION

The use of modern communication systems through which to communicate is a necessary aspect of modern society. Many different communication services are regularly effectuated by many different users to effectuate many different types of communication services. Many essential, as well as many other, services are predicated upon the ready availability of, and ready access to, communication systems.

As advancements in communication technologies continue, additional communication services, as well as improvements to existing communication services, shall likely become available. Generally, the advancements in communication technologies provide manners by which to communicate data, communicated to effectuate a communication service, in more efficient manners, or at higher data communication rates, or in manners that better provide for successful delivery of data to a receiving station in spite of adverse communication conditions.

The use of digital communication techniques, for instance, has been made possible as a result of technological advancements in communication technologies. Many modern communication systems utilize digital communication techniques. The use of digital communication techniques provides various advantages. By digitizing data, redundancies in the data are more readily removed, permitting the data to be communicated in more efficient form, free of redundancies. Improved data throughput rates or reduced bandwidth requirements needed to communicate the data are permitted.

A radio communication system is an exemplary type of communication system. Digital communication techniques are regularly utilized in many modern radio communication systems.

A cellular communication system is an exemplary type of radio communication system. While cellular communication systems are constructed to be operable in conformity with any of various operating standards, the cellular communication systems generally include network infrastructures having a plurality of spaced-apart base transceiver stations. The base transceiver stations each define cells, and portable communication stations, carried by users, are generally able to communicate with a base transceiver station in whose cell that the portable communication station is positioned when communications are effectuated.

Several analogous types of wireless communication systems have been implemented, and others have been proposed, to encompass limited areas, for example, areas encompassed by a business office or building structure. So-called micro-cellular networks, private networks, and WLANs (Wireless Local Area Networks) are representative of radio communication systems that are operable, at least in various aspects, in manners analogous to operation of a cellular communication system. Additionally, communication systems that utilize ad hoc networks, i.e., do not utilize a fixed network, are also utilized or undergoing development.

Wireless local area networks are, in some respects, technological extensions of conventional local area networks. That is to say, both conventional local area networks and wireless local area networks generally provide for the communication of packet-formatted data. And, mobile nodes of a wireless local area network are analogous to, and sometimes functionally equivalent to, the fixed nodes of a local area network.

Wireless communication systems, such as the aforementioned wireless local area networks are generally constructed to be operable in conformity with the operating protocols of a selected communication standard. While various promulgated operating standards have achieved widespread adoption, many wireless local area networks are constructed to be operable in conformity with an IEEE 802.11(b), operating specification, or a variant thereof. The IEEE 802.11(b) standard is promulgated by the IEEE, and the operating specification has become a predominant wireless LAN standard pertaining to a commercial 2.4 GHz wireless LAN (Local Area Network) frequency range as well as an unregulated band in the 5 GHz frequency range. The 802.11(b) standard specifies, amongst other things, an over the air interface between a wireless client, e.g., a mobile node, and a base station or access point.

Unlike some other communication systems implemented at other frequency bands, the frequency bands allocated for wireless local area networks are relatively unregulated, permitting their speedy deployment and re-deployment, as needed.

Mobile nodes operable in wireless local area networks are typically constructed to monitor selected frequencies within the allocated frequency bands to detect a wireless local area network within communication range of the mobile node. Access points, or other devices, of a wireless local area network broadcast signals to alert mobile nodes of the wireless local area networks of which the access points, or other devices, form portions.

While a plurality of WLANs might be available to a mobile node when the mobile node is positioned at a particular location, there is generally a preference to attempt to communicate by way of a certain WLAN or certain WLANs of the available WLANs. The WLANs are identified by SSIDs (Service Set Identifiers). An SSID is not necessarily unique to a particular WLAN. For instance, a plurality of WLANs operated by a single operator are sometimes identified by a single SSID. Different ones of the WLANs operated by the single operator might be located at widely disparate locations. The relative preference of a mobile node to communicate with a WLAN, identified by an SSID, might well be dependent upon the location at which the mobile node is positioned when communications are to be effectuated. When the mobile node is positioned in one location, for instance, the WLAN, identified by an SSID, might have a first level of preference. But, when the mobile node is positioned at another location, a WLAN identified by the same SSID might well have a different level of preference.

A single list identifying, in order of preference, WLANs, identified by SSIDs, is therefore an inadequate manner by which to identify through which networks that a mobile node should attempt to communicate.

Additionally, the preferences do not necessarily remain static over extended time periods. For instance, network operators enter into preferred roaming agreements, and in other preferred roaming agreements with some regular occurrence. A static listing of preferences is also inadequate for this reason as the priority of preferences might well change over time.

It is in light of this background information related to WLAN network selection by a mobile node that the significant improvements of the present invention have evolved.

SUMMARY OF THE INVENTION

The present invention, accordingly, advantageously provides apparatus, and an associated method, by which to facilitate selection, at a mobile node, of a wireless local area network, or other radio network, through which to communicate.

Through operation of an embodiment of the present invention, a manner is provided by which to select an available wireless local area network (WLAN) or other radio network through which to attempt to communicate using an hierarchical selection process. Through the hierarchical selection process, a prioritization of networks through which the mobile node attempts to communicate is provided. The hierarchical selection process makes use of a plurality of lists, each selectably containing entries identifying networks with which the mobile node is permitted to attempt to communicate.

The entries contained on the different ones of the lists identify, in sequential order, identifiers that identify networks with which the mobile node is permitted to attempt to communicate. When communications are to be effectuated by the mobile node, a determination is made of the availability of WLANs, or other radio networks, at the position at which the mobile node is located when the communications are to be effectuated. Comparisons are made between the available networks and networks identified on a first of the lists. If a match is noted, the mobile node attempts to communicate with the associated network. If no match is found, or the mobile node is unable to communicate with an available network also noted in the first list, a second list is accessed and the comparisons are performed again. The process continues with successive lists of the plurality of lists until communications are effectuated or the efforts are terminated.

Through appropriate selection of the entries on the different ones of the lists, and appropriate ordering of the lists, improved selectivity of the selection process is permitted.

In one aspect of the present invention, the mobile node is associated with a home network. The mobile node is, for instance, a multi-mode device operable separately in a cellular communication system and in a wireless local area network. And, the home network with which the mobile node is associated forms a cellular network. The network operator of the cellular network further selectably operates one or more wireless local area networks. When the home network operator of the home network associated with the mobile node also operates a wireless local area network, the wireless local area network operated by the home network operator, generally prefers that the mobile node communicate by way of the wireless local area network that the home network operator operates. If additional wireless local area networks are also operable in the same area in which the wireless local area network operated by the home network operator is operable, the other wireless local area networks form less-preferred networks, with respect to the mobile node, through which to communicate. In one embodiment of the present invention, when the mobile node is positioned in an area encompassed by a wireless local area network operated by the home network operator of the mobile node, the mobile node first attempts to communicate by way of this wireless local area network. And, if communications cannot be effectuated with this preferred wireless local area network, communications are then attempted with a wireless local area network of the less-preferred networks.

In another aspect of the present invention, the wireless local area networks are operated by different network operators. And, affiliations are maintained between different ones of the network operators. The mobile node is also positionable in an area, not encompassed by a wireless local area network operated by the home network operator, but in which the area is encompassed by a wireless local area network operated by an operator that maintains an affiliation with the home network operator of the mobile node. Communication with the network that maintains such an affiliation is generally preferred over communications with a network that does not maintain an affiliation with the home network operator. Communications are therefore first attempted with the network having the network operator that maintains the affiliations with the home network operator. Other networks form less-preferred networks with whom communications are effectuated only upon failure of communication effectuation with the network operated by the affiliated-network operator.

In another aspect of the present invention, a user of the mobile node also maintains a preferential list of networks through which to communicate. If communications are unable to be effectuated between the mobile node and a home-network-operated wireless local area network or between the mobile node and a network that maintains an affiliation with the home network operator, then efforts are made, if possible, to effectuate communications by the mobile node with a wireless local area network noted by the user to be a preferred network.

Determinations are made at the mobile node of the wireless local area networks in whose coverage areas that the mobile node is positioned by monitoring signals broadcast by the networks. The signals contain values identifying the networks. The values are extracted from the signals, once detected by the mobile node, and the values are compared with stored values contained on separate lists. A first list identifies the home network associated with the mobile node as well as any other network that is considered to be the home network of the mobile node. A second list identifies preferred networks, networks preferred by the home network operator through which to communicate when communications are unable to be effectuated with a home network operated network. A third list identifies networks of roaming, and other, partners of the home network operator. And, a fourth list identifies networks that are preferred by the user of the mobile node.

When communications are to be effectuated by the mobile node, the lists are accessed in sequence to determine whether a network identified in the accessed list is a network in whose coverage area that the mobile node is positioned. If a match is found, then the mobile node attempts to communicate with the matched network. Otherwise, a subsequent list is accessed, and the procedure is repeated until a network is accessed and communications are effectuated.

In these and other aspects, therefore, apparatus, and an associated method, is provided for a radio communication system. The radio communication system has a mobile node that is selectably operable to communicate data within at least a first frequency band within which a group of networks is operable to communicate. Selection of at least a first selected network of the group of networks with which to attempt by the mobile node, to communicate the data is facilitated. A first storage entity is embodied at the mobile node. The first storage entity stores a first list of entries identifying a first set of networks of the group of networks. At least a second storage entity is embodied at the mobile node. The at least the second storage entity stores at least a second list of entries identifying at least a second set of networks of the group of networks. An available network list creator is embodied at the mobile node. The available network list creator creates an available network list of entries that identifies which, if any, networks of the group of networks are within communication range of the mobile node. A selector is adapted to receive indications of a first list of entries stored at the first storage entity, to receive indications of the at least the second list of entries stored at the at least the second storage entity, and to receive indications of the available list of entries. The selector selects which, if any, network to be the at least the first selected network with which to attempt to communicate the data. Selection is made by the selector first of networks, if any, listed on both the first list and the available list. And, thereafter, the selector makes selection, if necessary, of networks, if any, listed on both the first list and the available list.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
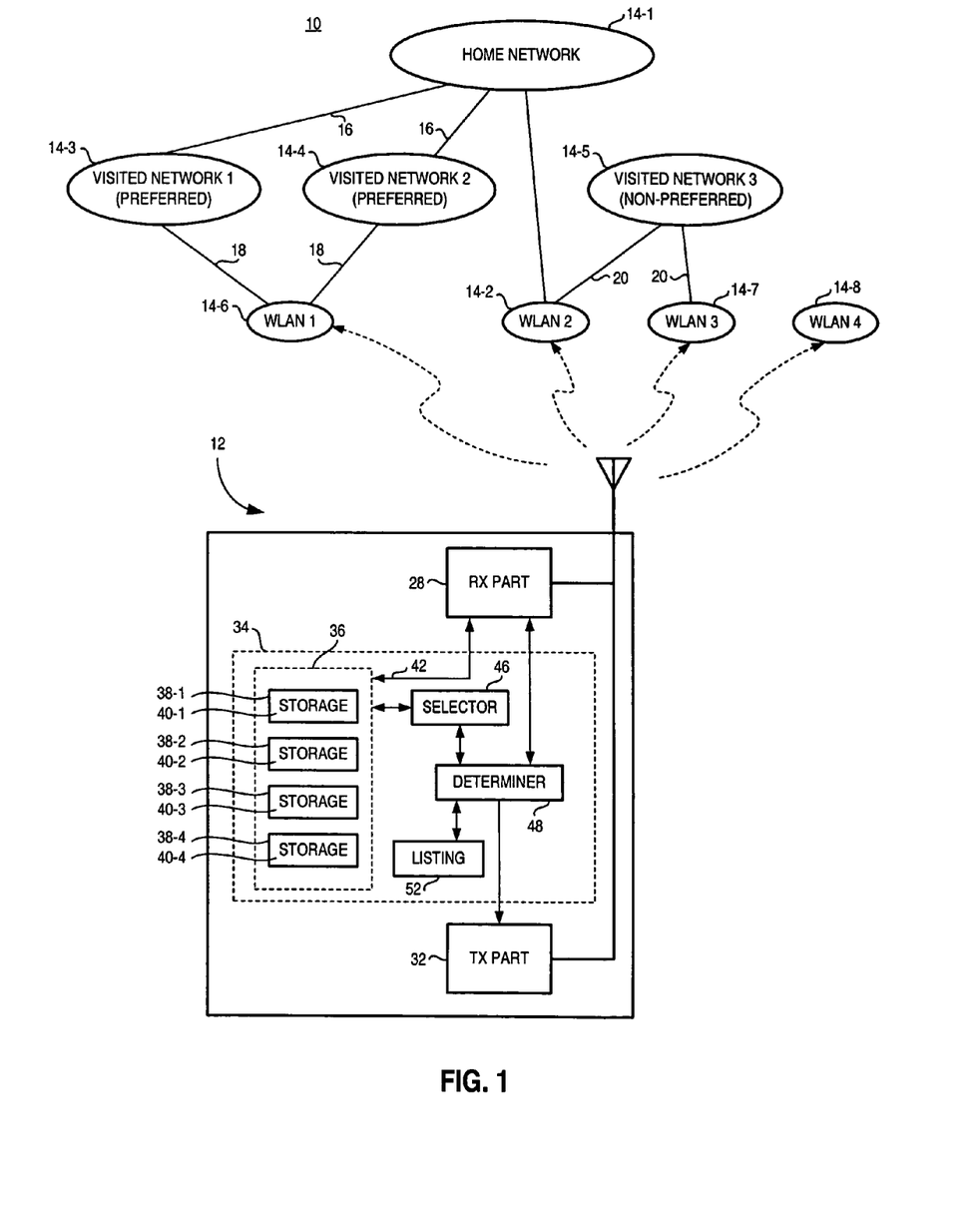
FIG. 1 illustrates a functional block diagram of an exemplary radio communication system in which a mobile node of an embodiment of the present invention is operable.

Referring to FIG. 1, a radio communication system, shown generally at 10, provides for radio communications with mobile nodes, of which the mobile node 12 is representative. The mobile node is movable, positionable, at different times, at different locations. In the exemplary implementation, the mobile node, as well as portions of a network part of the communication system, are operable generally in conformity with the operating protocols promulgated in the IEEE 802.11(b) operating specification. While the following description shall describe exemplary operation of the communication system, in which the mobile node and portions of the network part operate pursuant to other implementations, a communication system is operable pursuant to other radio communication standards. For example, the communication system is alternately operable pursuant to the IEEE 802.11(a) or (g) standards, or another communication standard.

The radio communication system includes a network part, here shown to be formed of a plurality of networks 14. The networks 14 are defined in terms of the designations of the networks defined by the mobile node 12. The networks are defined by other mobile nodes in other manners, and the designations of the networks 14 shown in the figure would correspondingly be altered if designated in the manners defined by such other mobile nodes. And, the networks, and their interrelationships are exemplary only.

Here, the mobile node 12 is associated with a particular network forming the home network 14-1 associated with the mobile node. The mobile node is, in the exemplary implementation, a multi-mode device, operable in a cellular communication system as well as a wireless local area network. In this exemplary embodiment, therefore, the home network 14-1 defines a cellular network operated by a network operator. The network operator also operates the network 14-2, a wireless local area network. The same identifier is used to identify both of the networks 14-1 and 14-2.

Three visited networks, networks 14-3, 14-4, and 14-5, are also shown in the figure. The networks 14-3, 14-4, and 14-5 are also, e.g., cellular networks. The operator of the home network 14-1 maintains relationships, indicated by the segment 16, with the operators of the networks 14-3 and 14-4. Due to the relationships of the operators of the networks 14-3 and 14-4 with the home network operator, the networks 14-3 and 14-4 form preferred networks with respect to the home network. That is to say, when the mobile node 12 is roaming, or is otherwise not communicating with its home network or the network 14-2 associated with the home network, first communication preference is with one of the preferred networks 14-3 and 14-4. Because a corresponding relationship is not maintained between the home network operator and the operator of the network 14-5, the network 14-5 forms a non-preferred network.

Relationships, indicated by the segments 18, are maintained by the networks 14-3 and 14-4 with the network 14-6, a wireless local area network. Analogously, relationships, indicated by the segments 20, are maintained by the operator of the network 14-5 with the networks 14-2 and 14-7. The network 14-7 is also a wireless local area network. An eighth network 14-8 is also represented. The network 14-8 is also a wireless local area network. The network 14-8 here does not maintain a relationship with another network.

As the exemplary network portion of the communication system shown in FIG. 1 indicates, the mobile node might well be positioned at a location encompassed by the coverage areas of more than one wireless local area network. Depending upon the home network associated with the mobile node, affiliations between the network operator of the home network of the mobile node and the network operators of other networks, as well as other criteria, effectuation of communications with one of the wireless local area network is preferred over others of the wireless local area networks. The preference is location-dependent, as noted previously. When the mobile node is positioned at a second location, the order of preferences of wireless local area networks with which to effectuate communications might well differ in the order of preference when the mobile node is positioned at the first location. Furthermore, the orders of preference are not static, but rather are changeable, such as with changes in the affiliations between the different network operators of the different networks. A single listing, or an unchanging listing, of wireless local area networks that identifies, in order of preference, identities of wireless local area networks with which to attempt to communicate is inadequate accurately to identify the preference order of networks with which the mobile node should attempt to effectuate communications.

An embodiment of the present invention provides a manner by which better to identify the network with which the mobile node should attempt to effectuate communications. Multiple lists are created and stored at the mobile node. The lists are selectably accessed to determine with which network that the mobile node should attempt to effectuate communications.

The mobile node 12 includes radio transceiver circuitry, here shown to include a receive part 28 and a transmit part 32. The mobile node also includes apparatus 34, of an embodiment of the present invention. The apparatus 34 operates to facilitate selection, by the mobile node of with which network that the mobile node attempts to communicate when communications are to be effectuated with the mobile node. Here, the apparatus includes a storage element 36 that defines a plurality of storage entities 38. Each of the storage entities, here storage entities 38-1, 38-2, 38-3, and 38-4, stores a listing 40 formed of a selected number of entries. The listings, here the strings 40-1, 40-2, 40-3, and 40-4, and the entries forming such listings are stored at the storage element during configuration of the mobile node, or downloaded to the mobile node when appropriate. The segment 42 is representative of the connection between the receive part 28 and the storage element permitting the downloading of the information to the storage element. The apparatus further includes a selector 46. The selector accesses the storage entities and the listings formed at the respective ones of the entities to select with which network that the mobile node attempts to communicate when communications are to be effectuated by the mobile node.

Also during operation of the mobile node, determinations are made, here by determiner 48, of which networks are within communication range of the mobile node. Determinations are made, for instance, by monitoring the channels upon which wireless local area networks broadcast SSID identifying signals. An available network listing 52 is maintained by the determiner that lists the available networks, i.e., networks within the communication range of the mobile node.

When communications are to be effectuated by the mobile node, the selector obtains indications of the available networks maintained at the listing and compares the networks with the networks listed on the first listing 40-1. If a match is noted, the selector selects that network, or those networks, and communications are attempted with that network, or those networks, in sequence. If no match is found, or no communication link can be formed with the selected network, or networks, the selector accesses the second listing 40-2 and the same comparison is made and, if a match is found, communications are attempted to be effectuated with the selected network. The remaining ones of the listing are accessed, if needed, in sequence in like fashion.

In the exemplary implementation, the listing 40-1 forms a home network SSID list that contains one or more SSIDs that are considered to be the home network for the mobile node. The second listing 40-2, in the exemplary implementation, forms a preferred network SSID list. The listing contains any selected number of SSIDs, e.g., identifiers that identify other WLAN networks that provide service to a cellular network. The listing 40-3 is an other networks SSID list. The listing contains also any selected number of SSIDs that, here, identify other roaming partners of the home network of the mobile node. And, the fourth listing 40-4 forms a user preferred network SSID list that also includes any desired number of SSID identifiers.

The selector scans the frequency bands to locate all of the available networks that are within communication range of the mobile node, and indications of the SSID values of such networks is maintained at the listing 52. The selector first determines whether any of the available SSIDs are also listed in the home network listing 40-1. If so, one of the indicated SSIDs is chosen, e.g., at random connections with other matching networks if communications with the first-selected network are not selected.

If none of the matching networks of the first listing 40-1 result in successful communications, then a preferred network is selected from the listing 40-2, if any of such networks match the available networks listed at the listing 52. If unsuccessful, the third listing 40-3 is accessed, then the fourth listing 40-4, if necessary. And, if none of the matches results in a successful communication link, then a random selection is made of an available network and communications are attempted to be effectuated therewith.

Thereby, through the use of multiple listings 40, increased selectivity of selection of a wireless local area network with which to attempt communications is provided.

Figure 2:
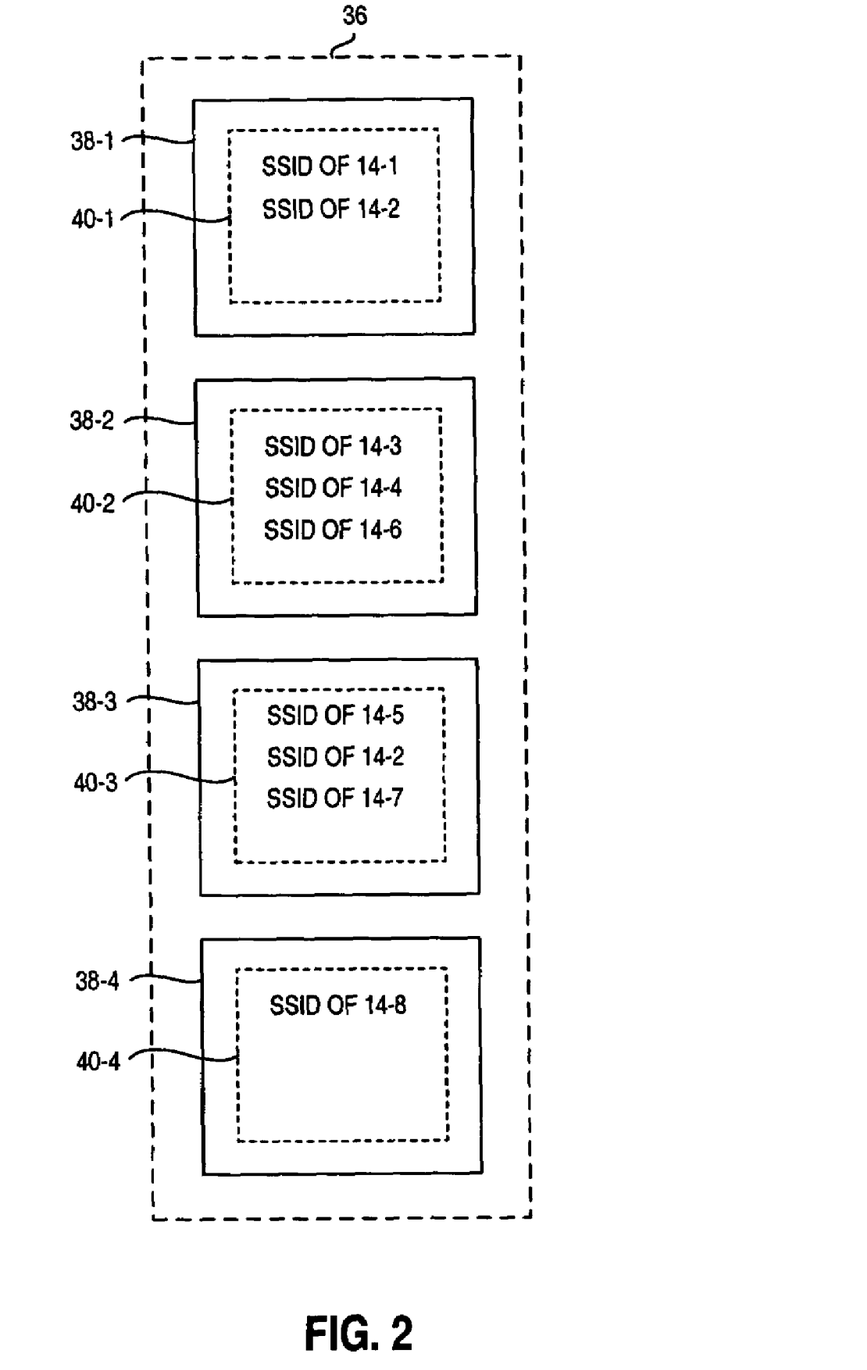
FIG. 2 illustrates a representation of the lists that are created and maintained at the mobile node and used pursuant to operation of an embodiment of the present invention.

FIG. 2 illustrates the storage element 36 that forms a portion of the apparatus 34 embodied at the mobile node 12 shown in FIG. 1. The storage element is again shown to include a plurality of storage entities, here the storage entities 38-1, 38-2, 38-3, and 38-4. Each of the storage elements stores a listing 40, formed of a set of entries, each entry of the set identifying a network, such as one of the networks 14-6, 14-2, 14-7, and 14-8. The wireless local area networks are each identified by a service set identifier (SSID), and the lists 40 are formed of any of appropriate number of SSID values.

Here, the list 40-1 maintained at the storage element 38-1 includes the SSID of the home network 14-1 and the wireless local area network 14-2. The listing 40-2 embodied at the storage entity 38-2 includes the SSIDs of networks with which the home network operator of the home network 14-1 maintains affiliations. Here, the identifiers of the networks 14-3, 14-4, and 14-6 are contained in the listing 40-2.

The listing 40-3 embodied at the storage entity 38-3 is formed of the identifiers of lesser-preferred networks but those with which the home network operator of the home network associated with the mobile node maintains an affiliation. Here, the identifiers of the networks 14-5, 14-2, and 14-7 are the entries that form the listing 40-3. The listing 40-4 embodied at the storage entity 38-4 identifies networks that are preferred networks of a user of the mobile node. Here, the identifier that identifies the network 14-8 is the user-preferred network, and the identity of the network forms the entry of the listing 40-4. Others of the networks are also selectable by the user of the mobile node to be preferred networks, the identities of which are stored at the storage entity 38-4.

Figure 3:
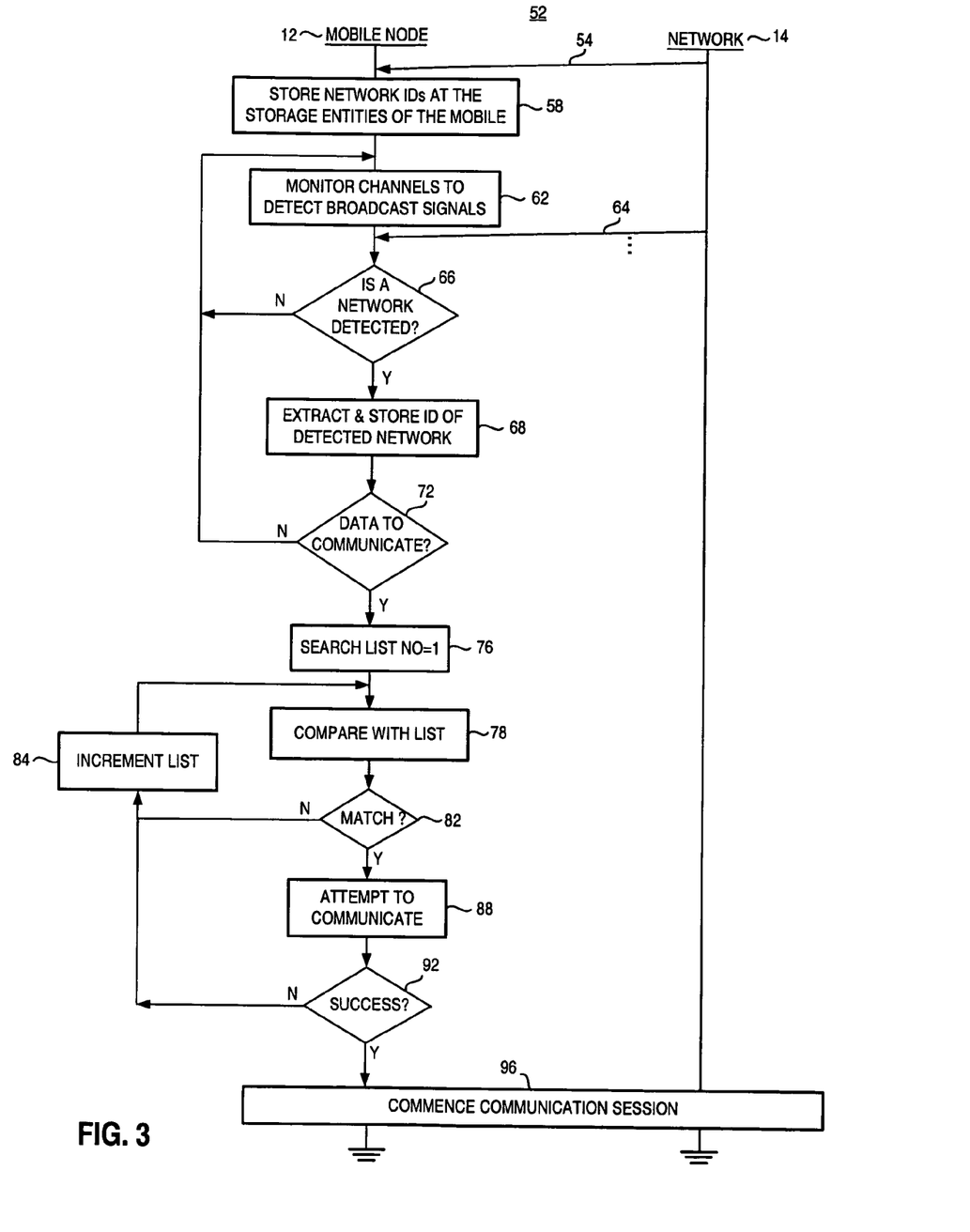
FIG. 3 illustrates a partial process, partial message sequence, diagram representative of operation of the communication system shown in FIG. 1 and the mobile node operable therein.

FIG. 3 illustrates a representation, shown generally at 52, of exemplary operation of the communication system 10 shown in FIG. 1. Here, operation of the mobile node, together with its interaction with the network 14 of the communication system pursuant to operation of an embodiment of the present invention is represented.

The listings maintained at the mobile node are created by downloading, here indicated by the segment 54, of information to the mobile node by the network of the communication system. The downloaded information is stored, indicated by the block 58, at appropriate storage entities 38 (shown in FIG. 1) of the mobile node.

Thereafter, and as indicated by the block 62, the mobile node monitors channels upon which broadcasts of signals by the portions of the network 14 are sent. Signals broadcast by different portions of the network are indicated by the segment 64. When the mobile node is positioned within reception range of the signals, the receive part of the mobile node detects the broadcast signals. A determination is made, indicated by the decision block 66, as to whether the signals broadcast by any of the network portions are detected. If not, the no branch is taken, and the mobile node continues to monitor the channels. If, conversely, signals are detected by the mobile node, the mobile node operates to extract and to store, as indicated by the block 68, identification information, such as the SSID values, of the network whose signals are detected.

Thereafter, and as indicated by the decision block 72, a determination is made as to whether data is to be communicated by the mobile node. If not, the no branch is taken and channels continue to be monitored. Otherwise, if data is to be communicated, the yes branch is taken. One or more of the storage entities 38 (shown in FIG. 1) are accessed to determine with which of the network portions that the mobile node shall attempt to communicate.

Here, search is first made of the entries of the first listing by setting a variable, indicated at the block 76, to cause the first listing first to be searched. Comparisons are made, indicated by the block 78, to determine whether the network in whose communication range that the mobile node is positioned is listed on the access list. The determination is indicated by the decision block 82. If no match is made, the no branch is taken, and another list is accessed, here indicated by incrementing the list number at the block 84.

If, conversely, a match is detected, the yes branch is taken, and the mobile node attempts to communicate, indicated by the block 88, with the network. A determination is then made, as indicated by the decision block 92, as to whether the attempt is successful. If not, the no branch is taken. Otherwise, the yes branch is taken, and a communication session commences, indicated by the block 96.

Figure 4:
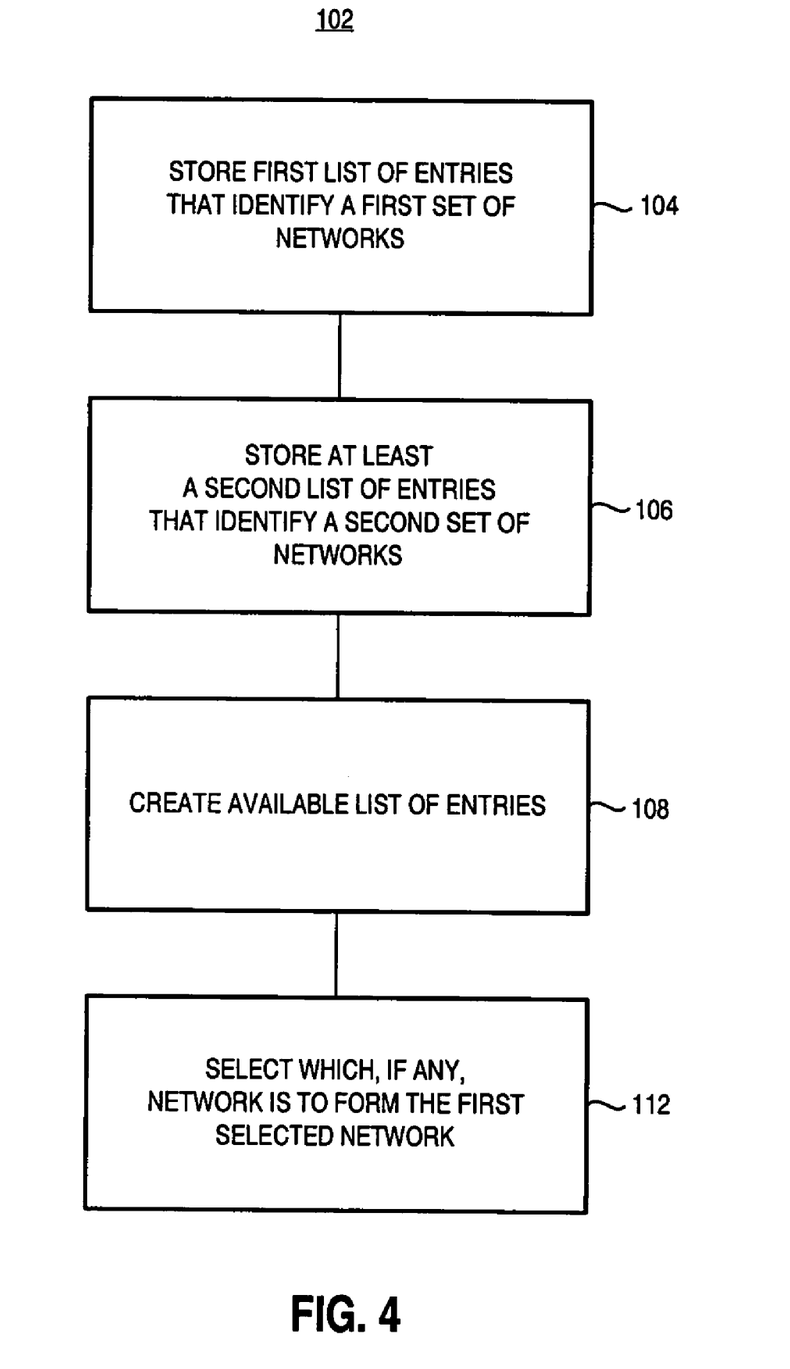
FIG. 4 illustrates a method flow diagram listing the method steps of the method of operation of an embodiment of the present invention.

FIG. 4 illustrates the method, shown generally at 102, of operation of an embodiment of the present invention. The method facilitates selection of at least a first selected network of a group of networks within which to attempt, by a mobile node, to communicate data.

First, and as indicated by the block 104, a first list of entries is stored that identifies a first set of networks of the group of networks. Then, and as indicated by the block 106, at least a second list of entries is stored that identifies at least a second set of networks of the group of networks. And, as indicated by the block 108, an available-network list of entries is created that identifies which, if any, networks of the group of networks are within communication range of the mobile node.

Thereafter, and as indicated by the block 112, selection is made, of which, if any, network is to be the at least the first selected network with which to attempt to communicate data. Selection is first made of networks, if any, listed on both the first list and the available list. And, thereafter, if necessary, selection is made of networks, if any, listed on both the first list and the available list.

Through appropriate selection of which networks have their identities stored at different ones of the lists, better selection of with which network that the mobile node should attempt first to communicate is better made. Because the entries on the storage lists are dynamically updatable, as selection criteria changes, appropriate changes are made to the listings.

The previous descriptions are of preferred examples for implementing the invention, and the scope of the invention should not necessarily be limited by this description. The scope of the present invention is defined by the following claims.

What is claimed is:

1. Apparatus for a mobile node to facilitate selection of at least a first selected network of a group of networks with which to attempt, by the mobile node, to communicate data, said apparatus comprising:

a first storage entity embodied at the mobile node, said first storage entity for storing a first list of entries identifying a first set of networks of the group of networks;

at least a second storage entity embodied at the mobile node, said at least second storage entity for storing at least a second list of entries identifying at least a second set of networks of the group of networks;

an available-network-list creator embodied at the mobile node, said available-network-list creator for creating an available-network-list of entries identifying which, if any, networks of the group of networks are within communication range of the mobile node;

a selector adapted to receive indications of the first list of entries stored at said first storage entity, to receive indications of the at least the second list of entries stored at said at least second storage entity, and to receive indications of the available list of entries, said selector for selecting which, if any, network to be the at least the first selected network with which to attempt to communicate the data, selection made by said selector first of networks, if any, listed on both the first list and the available list and thereafter, if necessary, of networks, if any, listed on both the second list and the available list.

2. The apparatus of claim 1 wherein the networks of the group of networks comprises wireless local area networks, each wireless local area network identified by a service set identity, wherein each of the wireless local area networks broadcasts control signals that include values of the service set identity by which the wireless local area network is identified, and wherein said available-network-list creator is adapted to receive indications of the service set identity contained in the control signals broadcast by the wireless local area networks within communication range of the mobile node.

3. The apparatus of claim 2 wherein the first list of entries, stored at said first storage entity and which identify the first set of networks, identify each network of the first set by the service set identity associated therewith.

4. The apparatus of claim 2 wherein the second list of entries, stored at said second storage entity and which identify the second set of networks identify each network of the second set by the service set identity associated therewith.

5. The apparatus of claim 1 wherein the mobile node is associated with a home network, the home network forming a cellular network operable pursuant to a selected cellular standard protocol, wherein the networks of the group of networks comprise wireless local area networks operable pursuant to a wireless local area network standard protocol, wherein the mobile node is selectably operable pursuant to either of the cellular standard protocol and the wireless local area network standard protocol, and wherein, when said selector selects said first selected network, the mobile node operates pursuant to the wireless local area network protocol to communicate with the first selected network.

6. The apparatus of claim 5 wherein the cellular network forming the home network associated with the mobile node is operated by a home-network operator, wherein at least one of the networks of the group of networks that comprise the wireless local area networks is also operated by the home-network operator and wherein the first set of networks, identities of which form the first list stored at said first storage entity, comprises the at least one of the networks of the group of networks that is operated by the home-network operator.

7. The apparatus of claim 6 wherein said selector selects a network, an identity of which is stored at said first storage entity, if any, of the group of networks that is operated by the home-network operator as the first selected network with which to communicate the data.

8. The apparatus of claim 7 wherein the at least one network of the group of networks that is operated by the home-network operator comprises a first home-network-operated network and at least a second home-network-operated network, wherein identities of the first and at least second home-network-operated networks are stored at said first storage entity, wherein the available-network-list created by said available-network-list creator contains the identities of both of the first and the second home-network-operated networks, and wherein said selector selects one of the first and the second home-network-operated networks as the first selected network according to a selection critena.

9. The apparatus of claim 8 wherein, if the mobile node is unable to communicate the data to a first selected one of the first and the second home-network-operated networks selected to be the first selected network, said selector selects another of the first and the second home-network-operated networks as the first selected network.

10. The apparatus of claim 5 wherein the cellular network forming the home network associated with the mobile node is operated by a home network operator, wherein at least one of the networks of the group of networks is operated by a non-home network operator, and wherein the at least the second set of networks, identities of which form the at least the second list stored at said at least second storage entity comprises the at least one of the networks of the group of networks that is operated by the non-home network operator.

11. The apparatus of claim 10 wherein the home network operator and the non-home network operator maintain an affiliation therebetween and wherein the at least one of the networks of the group of networks that is operated by the non-home network operator, an identity of which forms at least part of the second list stored at said second storage entity, is operated by the non-home network operator with whom the affiliation is maintained.

12. The apparatus of claim 11 wherein said selector selects a network, an identity of which is stored at said second storage entity, if any, of the group of networks that is operated by the non-home network operator as the first selected network with which to communicate the data when the network that is operated by the non-home network operator is contained on both the available-network-list and the second list and communications are not effectuated with any network operated by the home network operator, listed at said first storage entity.

13. The apparatus of claim 1 wherein said at least second storage entity comprises said second storage entity and at least a third storage entity, said third storage entity for storing a third list of entries identifying at least a third set of networks of the group of networks.

14. The apparatus of claim 13 wherein said selector further selects, if necessary, a network, if any, identified at the third list stored at said storage entity as the first selected network with which to communicate data.

15. The apparatus of claim 13 wherein said at least third storage entity comprises said third storage and at least a fourth storage entity, said fourth storage entity for storing a fourth list of entries identifying at least a fourth set of networks of the group of networks.

16. The apparatus of claim 15 wherein said selector further selects, if necessary, a network, if any, identified at the fourth list stored at said fourth storage entity as the first selected network with which to communicate data.

17. A method for facilitating selection of at least a first selected network of a group of networks with which to attempt, by a mobile node, to communicate the data, said method comprising:

storing a first list of entries identifying a first set of networks of the group of networks, each network identified in the first list being a network with which the mobile node is permitted to communicate;

storing at least a second list of entries identifying at least a second set of networks of the group of networks, each network identified in the second list being a network with which the mobile node is permitted to communicate;

creating an available-network list of entries identifying which, if any, networks of the group of networks are within communication range of the mobile node;

selecting which, if any, network to be the at least the first selected network with which to attempt to communicate the data, selection first made of networks, if any, listed on both the first list and the available list and thereafter, if necessary, of networks, if any, listed on both the first list and the available list.

18. The method of claim 17 further comprising the operation of storing at least a third list of entries identifying at least a third set of networks of the group of networks and wherein said operation of selecting further comprises the operation of selecting, if necessary, a network, if any, identified at the third list.

19. The method of claim 18 further comprising the operation of storing at least a fourth list of entries identifying at least a fourth set of networks and wherein said operation of selecting further comprises the operation of selecting, if necessary, a network, if any, identified at the third list.

20. The method of claim 17 further comprising the operation of attempting to communicate with the first selected network selected during said operation of selecting.

* * * * *